United States Patent
Gagas et al.

(10) Patent No.: US 10,293,667 B2
(45) Date of Patent: May 21, 2019

(54) REARWARD LONGITUDINALLY-PIVOTING UTILITY VEHICLE DOOR

(71) Applicant: Excel Industries, Inc., Hesston, KS (US)

(72) Inventors: John Michael Gagas, Milwaukee, WI (US); David Marshall, Wichita, KS (US); William Morris, Kingman, KS (US); Colin Mitchell Phillips, Lawrence, KS (US); Jayme Rochelle Rietcheck, Wichita, KS (US); Jeffry Brown, Coffeyville, KS (US)

(73) Assignee: Excel Industries, Inc., Hesston, KS (US)

( * ) Notice: Subject to any disclaimer, the term of this patent is extended or adjusted under 35 U.S.C. 154(b) by 176 days.

(21) Appl. No.: 15/135,233

(22) Filed: Apr. 21, 2016

(65) Prior Publication Data

US 2016/0325608 A1  Nov. 10, 2016

Related U.S. Application Data

(60) Provisional application No. 62/158,392, filed on May 7, 2015.

(51) Int. Cl.
| | |
|---|---|
| *B60J 5/00* | (2006.01) |
| *E05D 5/12* | (2006.01) |
| *B60R 21/13* | (2006.01) |
| *B60J 5/04* | (2006.01) |
| *E06B 3/38* | (2006.01) |
| *E05D 3/02* | (2006.01) |
| *E05D 11/06* | (2006.01) |

(Continued)

(52) U.S. Cl.
CPC .......... *B60J 5/0472* (2013.01); *B60J 5/0487* (2013.01); *E05D 5/12* (2013.01); *E05D 5/121* (2013.01); *E06B 3/38* (2013.01); *B60R 21/13* (2013.01); *E05D 3/02* (2013.01); *E05D 11/06* (2013.01); *E05D 11/10* (2013.01); *E05D 2005/102* (2013.01)

(58) Field of Classification Search
CPC ......... B60J 5/0472; B60J 5/0487; E05D 5/12; E05D 5/121; E05D 11/06; E05D 11/10; E05D 2005/102; E06B 3/38; B60R 21/13
See application file for complete search history.

(56) References Cited

U.S. PATENT DOCUMENTS

| | | | |
|---|---|---|---|
| 6,286,187 B1 * | 9/2001 | Chang ..................... | E05D 11/02 16/340 |
| 6,676,193 B1 * | 1/2004 | Hanagan ................ | B60J 5/0472 296/146.11 |

(Continued)

*Primary Examiner* — Barry Gooden, Jr.
(74) *Attorney, Agent, or Firm* — Shook, Hardy & Bacon L.L.P.

(57) ABSTRACT

Provided is a rearwardly-pivoting door having a pivoting arc in the longitudinal direction of a vehicle. The door may be pivotally coupled with the vehicle by a hinge assembly at a rear portion of the door and a front portion is slidably engaged in a channel receiver when the door is in a closed position. The hinge assembly and channel receiver resist lateral movement of the door to maintain an occupant within a seating area of the vehicle. One or more securing devices may be utilized to maintain the door in an opened or closed position. The securing device may be mechanical and/or magnetic.

17 Claims, 4 Drawing Sheets

(51) Int. Cl.
*E05D 5/10* (2006.01)
*E05D 11/10* (2006.01)

(56) References Cited

U.S. PATENT DOCUMENTS

| | | | | |
|---|---|---|---|---|
| 7,464,439 B2* | 12/2008 | Chen | ................ | G06F 1/1616 16/330 |
| 7,779,510 B2* | 8/2010 | Hoffman | ................ | E05D 3/10 16/367 |
| 7,908,712 B2* | 3/2011 | Rudzewski | ............ | E05D 11/06 16/334 |
| 2007/0234515 A1* | 10/2007 | Chen | ................ | G06F 1/1616 16/337 |
| 2008/0079284 A1* | 4/2008 | Moreno | ................ | B60J 5/0472 296/146.12 |
| 2008/0083089 A1* | 4/2008 | Hoffman | ................ | E05D 3/10 16/367 |
| 2009/0007384 A1* | 1/2009 | Lin | ................ | E05D 11/06 16/375 |
| 2009/0013498 A1* | 1/2009 | Chern | ................ | G06F 1/1616 16/223 |
| 2009/0070964 A1* | 3/2009 | Rudzewski | ............ | E05D 11/06 16/375 |
| 2009/0134662 A1* | 5/2009 | Gojcaj | ................ | B60J 5/0472 296/146.11 |
| 2010/0276966 A1* | 11/2010 | Gojcaj | ................ | B60J 5/0472 296/146.11 |
| 2017/0129315 A1* | 5/2017 | Gale | ................ | B60J 5/0487 |

* cited by examiner

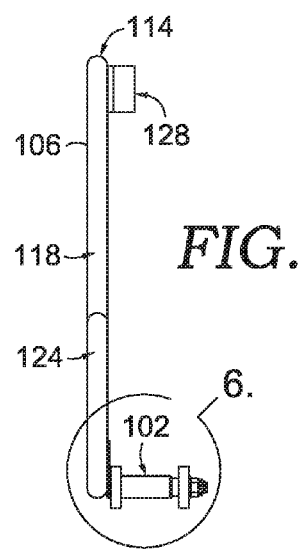
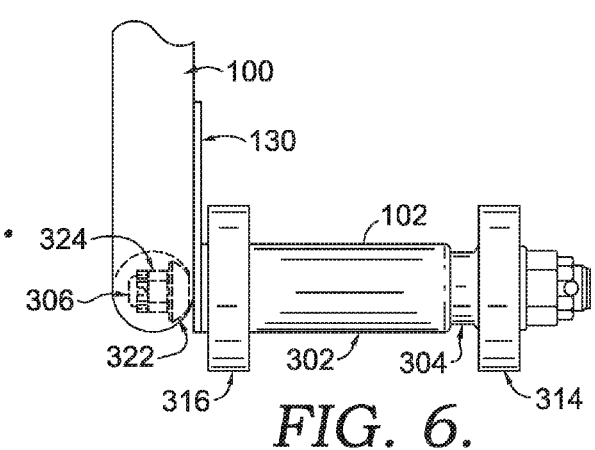
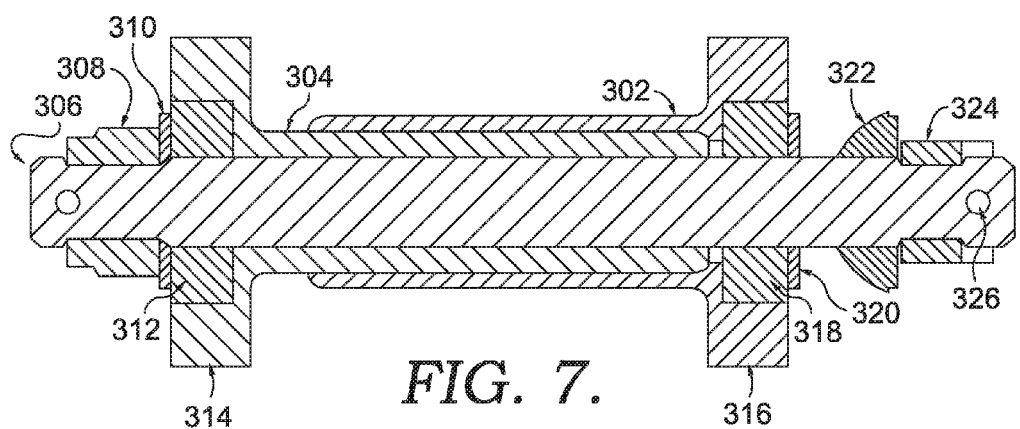
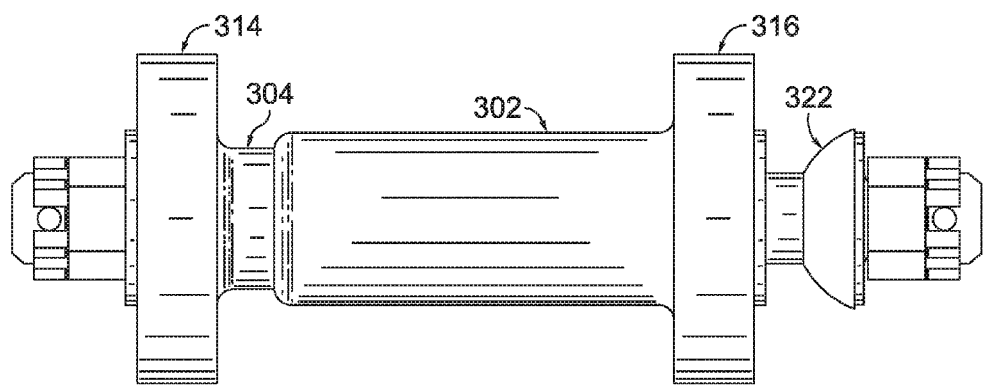

REARWARD LONGITUDINALLY-PIVOTING UTILITY VEHICLE DOOR

This application claims the benefit of U.S. Provisional Application No. 62/158,392, filed May 7, 2015, and entitled "Rearward Longitudinally-Pivoting Utility Vehicle Door." The entirety of the aforementioned application is incorporated by reference herein.

FIELD

Aspects provided relate to a pivoting occupant enclosure door that has an arc of motion in a longitudinal direction of a vehicle.

BACKGROUND

Recreational and utility vehicles, such as a side-by-side utility vehicle where a driver and a passenger are seated next to each other in a laterally spaced apart seating area, provide an opportunity for carrying the occupants and cargo in locations that may not be as conducive to a traditional full-size road vehicle, such as a pickup truck. Because the utility vehicle may be operated on ground conditions that include bumps and turns, an occupant enclosure may be provided that is configurable to allow easy ingress and egress from the occupant space while still being enclosed sufficiently during operation to inhibit an unintentional egress of an occupant.

SUMMARY

Aspects hereof relate to a rearwardly-pivoting door having a pivoting arc in the longitudinal direction of a utility vehicle. The door may be pivotally coupled with the vehicle by a hinge assembly at a rear portion of the door and a front portion of the door is slidably engaged in a channel receiver when the door is in a closed position. The hinge assembly and channel receiver resist lateral movement of the door to maintain an occupant within a seating area of the vehicle. One or more securing devices may be utilized to maintain the door in an opened or closed position. The securing device may be mechanical and/or magnetic.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 5 depicts a front perspective of the longitudinally-pivoting door, in accordance with aspects hereof;

FIG. 6 depicts a zoomed view of a hinge assembly for the longitudinally-pivoting door, in accordance with aspects hereof;

FIG. 7 depicts a cross section of a hinge assembly, in accordance with aspects hereof;

FIG. 8 depicts a front perspective of the hinge assembly from FIG. 7, in accordance with aspects hereof.

DETAILED DESCRIPTION

Figure 1:
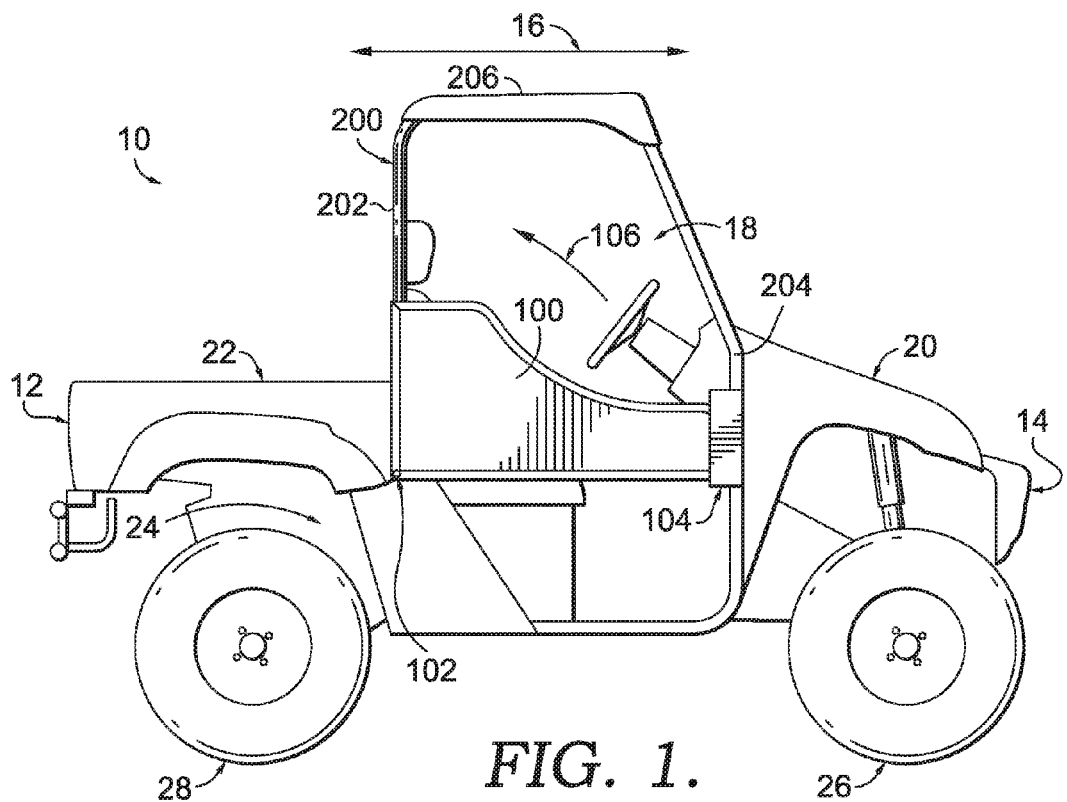
FIG. 1 depicts a utility vehicle having a rearwardly longitudinally-pivoting door in a closed position, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

While aspects provided herein refer to a utility vehicle, such as a side-by-side off-road-capable vehicle, it is contemplated that the features provided herein are applicable to other vehicle types, such as golf carts, lawn mowers, watercraft, agricultural equipment, and the like. Further, a utility vehicle may be referred to as an all-terrain vehicle (ATV) and/or a UTV, in some examples. Therefore, reference to a particular vehicle type is not limiting as to the scope of the concepts provided herein.

Aspects hereof relate to a rearwardly-pivoting door having a pivoting arc in the longitudinal direction of a utility vehicle. The door may be pivotally coupled with the vehicle by a hinge assembly at a rear portion of the door and a front portion of the door is slidably engaged in a channel receiver when the door is in a closed position. The hinge assembly and channel receiver resist lateral movement of the door to maintain an occupant within a seating area of the vehicle. One or more securing devices may be utilized to maintain the door in an opened or closed position. The securing device may be mechanical and/or magnetic.

A first exemplary embodiment provides for a utility vehicle comprising a frame extending in a longitudinal direction from a front end to a rear end; a plurality of wheels operably coupled to the frame; a seating area; and a side door pivotally mounted to the vehicle having a rearward pivotal arc extending in the longitudinal direction of the frame.

A second exemplary embodiment provides for a utility vehicle comprising: a frame extending in a generally longitudinal direction; a plurality of wheels operably coupled to the frame; a seating area at a first longitudinal position relative to the frame; a roll cage enclosing the seating area, and defined by a plurality of frame members coupled to the frame, at least some of the frame members being in the form of frame uprights, and the frame members defining an envelope around the seating area; and a side door pivotally coupled to a first frame upright of the frame uprights and being slidably secured proximate to a second frame upright of the frame uprights, the side door having a pivotable arc extending in the longitudinal direction of the vehicle between a closed position and an open position.

A third exemplary embodiment provides for a side door of a side-by-side utility vehicle having a roll cage, the side door having a pivotable arc in a longitudinal direction of the utility vehicle, the side door comprising: a frame, the frame having a front end and a rear end, the frame having a top edge and a bottom edge, the top edge and the bottom edge extending between the front end and the rear end, a distance between the top edge and the bottom edge at the rear end is greater than a distance between the top edge and the bottom edge at the front end; and a hinge assembly, the hinge assembly coupled with the frame proximate the bottom edge at the rear end, the hinge assembly extending laterally from the frame relative to a longitudinal direction of the bottom edge between the front end and the rear end, the hinge comprised of a hinge sleeve and a pin, the pin extending through the frame and the hinge sleeve, wherein the hinge sleeve is configured to at least partially extend through the roll cage, the hinge assembly is configured to pivotally couple the side door with the utility vehicle to allow a pivot arc in the longitudinal direction of the utility vehicle.

Figure 2:
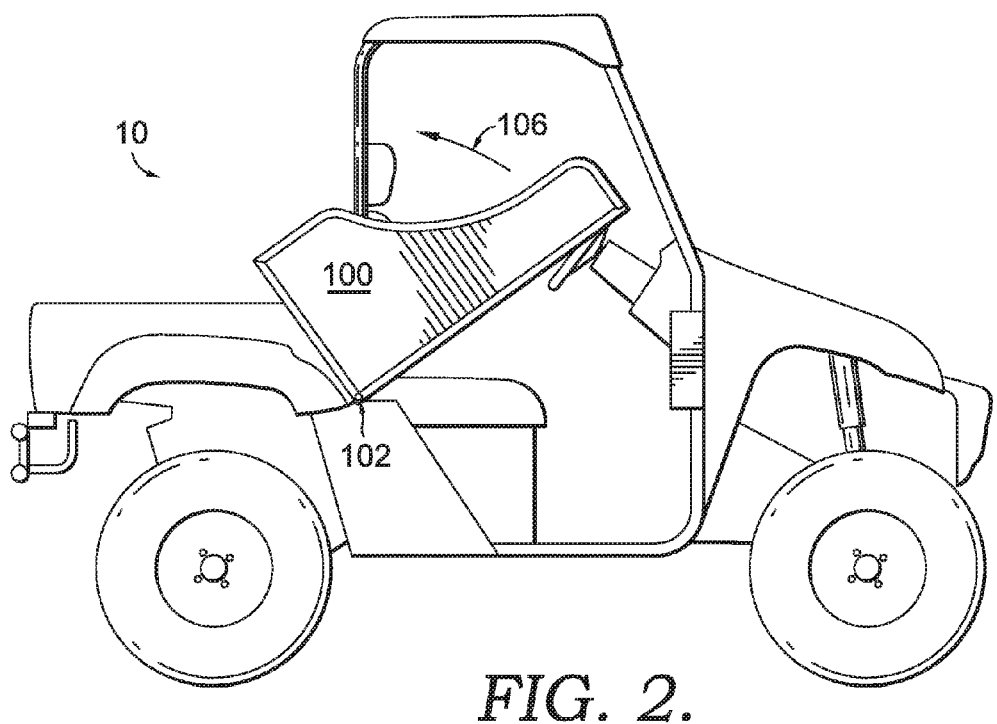
FIG. 2 depicts the utility vehicle having the rearwardly longitudinally-pivoting door in an intermediate position, in accordance with aspects hereof.
Figure 3:
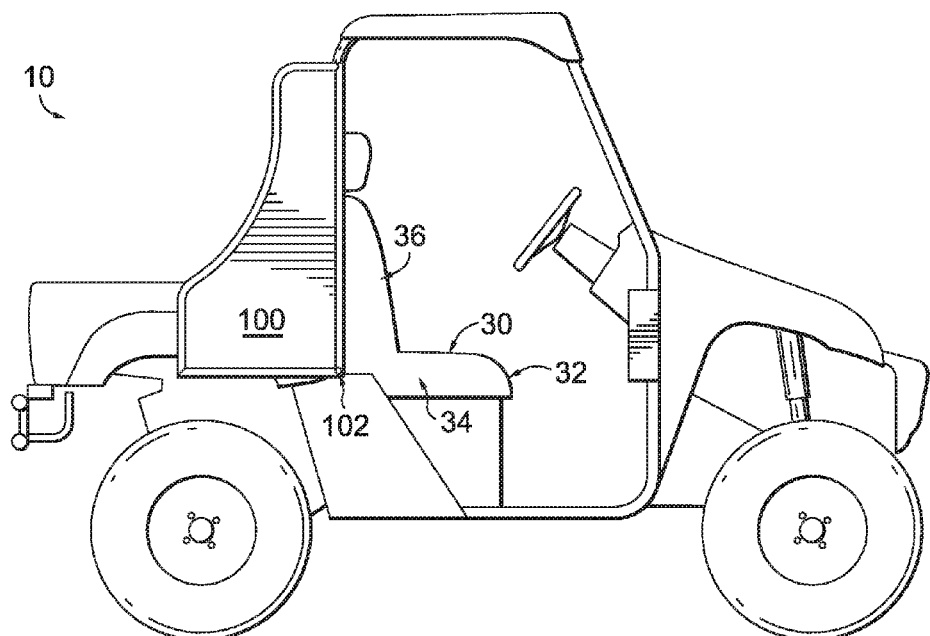
FIG. 3 depicts the utility vehicle having the rearwardly longitudinally-pivoting door in an open position, in accordance with aspects hereof.

FIGS. 1-3 depict a utility vehicle 10 having a side door 100 that pivots about the utility vehicle with an arc 106 in a longitudinal direction 16 of the vehicle, in accordance with aspects hereof. The utility vehicle 10 is comprised of a frame 24. The frame 24 supports a drive train effective for moving the utility vehicle 10, such as electric and/or petroleum-based power systems, as is well known in the art. A plurality of ground-engaging wheels 26, 28 are operably coupled with the frame 24 of the utility vehicle 10, as is also known in the art. Further, the utility vehicle 10 has a front 14 and an opposite rear 12 that generally define the longitudinal direction 16 for the utility vehicle 10 extending therebetween.

Different areas of the utility vehicle 10 may be generally provided along the general longitudinal length of the vehicle. A seating area 18 is provided between a cargo area 22 at the rear 12 and a hood area 20 at the front 14. The seating area 18 includes at least the portion of the vehicle from which an operator operates/drives the utility vehicle. Additional passengers may also be maintained in the seating area 18, in exemplary aspects. In this example, the seating area 18 is depicted as a single lateral row; however, it is contemplated that two or more rows of seating may be implemented in aspects hereof. For example, it is contemplated that a separate longitudinally-pivoting side door could be provided for each row. Further, it is contemplated that a single longitudinally-pivoting side door could be provided for multiple rows of seating. Also, while a bench-like seating arrangement is depicted, it is contemplated that other seating options may be implemented, such as bucket-style seating, in exemplary aspects.

The cargo area 22 is rearward of the seating area 18. The cargo area 22 is depicted as a cargo bed; however, it is contemplated that a cargo rack or no specific structure is provided rearward of the seating area 18. The hood area 20 is forward of the seating area 18. The hood area 20 may include storage, electrical components, hydraulic components, and/or drive-train components. It is contemplated that one or more portions of the drive train are maintained within or below the cargo area 22, the seating area 18, and/or the hood area 20, in exemplary aspects.

A roll cage 200, or sometimes referred to as a roll-over protection system (ROPS), is provided with the utility vehicle 10. The roll cage 200 is provided to protect and enclose at least a portion of the seating area 18. The roll cage 200 provides a protective canopy to the seating area 18 in the provided illustrations. The roll cage 200 is comprised of a rear upright frame member 202, a longitudinal frame member 206, and a front upright member 204 on a first side. It is contemplated that corresponding frame members are provided on another side of the utility vehicle (not shown). Both sides of the roll cage 200 are interconnected by one or more traverse members extending in a lateral direction between the sides of the roll cage. The roll cage 200 may be removably coupled or permanently coupled with the utility vehicle, such as the utility vehicle frame 24, in an exemplary aspect.

It is contemplated that multiple sections of a roll cage may be integrally connected to accommodate additional seating configurations. For example, if a second row of side-by-side seating was implemented behind a first seating area, the roll cage may include additional upright, longitudinal, and traverse members to form an integrally formed protection canopy around the various seating areas, in an exemplary aspect. As such, it is contemplated that a longitudinally-pivoting side door may be pivotally coupled to any member of the roll cage construction, such as an upright proximate a seat back for each of the seating areas enclosed by the roll cage, in an exemplary aspect.

The longitudinal arc 106 is provided for illustration purposes to demonstrate the door 100 transitioning from a closed position in FIG. 1 to an open position in FIG. 3 with an intermediate position in FIG. 2. In the closed position illustrated in FIG. 1, the door 100 extends from proximate (if not at) the rear upright frame 202 where the hinge assembly 102 pivotally couples the door 100 to the utility vehicle 10 forward toward the front upright frame 204. In aspects, the door 100 extends to the front upright frame 204. A channel receiver 104 having a channel for receiving the door 100 is disposed between a first and a laterally offset second wall. The lateral offset may be equal to or slightly greater than a lateral thickness of the door 100 to be received therein. The channel receiver 104 may be effective to resist a lateral force on the door 100, such as an occupant leaning outwardly (e.g., laterally) against the door 100 from within the seating area 18.

The receiving channel may be a U-shaped cavity with an upright ingress and egress portion for the door 100 to slidably be received within the cavity. For example, as the door 100 is pivoted about hinge assembly 102 to close the door 100, a forward portion of the door 100 may slide within the U-shaped cavity of the channel receiver 104 when in the closed position. It is further contemplated that the channel receiver 104 may be comprised of a floor structure between the laterally offset walls such that the floor is effective to support the door 100 at a closed position and to resist further downward rotation of the door 100 past a preferred closed position. It is contemplated that the floor portion of the channel receiver 104 in combination with a motion limit bracket may support and releasably secure the door 100 in a closed position, in accordance with aspects hereof. The floor portion may be integrally formed in a body panel or supplementally incorporated thereafter. Further, it is contemplated that one or more vibration dampening materials (e.g., rubber, foam) may be included within the receiver channel, such as at the floor structure, to resist vibrational noise and effective for dampening a stoppage of a closing rotation within the channel receiver, in an exemplary aspect.

The channel receiver 104 and/or the door 100 may be comprised of one or more releasable securing elements to maintain the door 100 in a closed position when desired. For example, a mechanical lock, clasp, buckle and the like may secure the door 100 within the channel receiver 104 when closed. Additionally or alternatively, it is contemplated that one or more magnetic elements may be implemented to provide an attractive force between the door and the utility vehicle 10 to maintain a closed position. For example, 5-30 pounds of force may be exerted by magnetic attraction to maintain the door 100 in a closed position within the channel receiver 104. In a specific aspect, 10-20 pounds of magnetic force may be used to releasably secure the door 100 in a closed (or open) position. It is contemplated that neodymium rare earth magnets may be permanently secured to at least one of the door 100 and/or the channel receiver 104 that is/are attracted to additional magnetic elements and or magnetic-responsive materials (e.g., ferrous materials) to achieve the desired magnetic attraction force. As will be discussed hereinafter, additionally or alternatively, configuration for a releasable coupling between the door 100 and the utility vehicle 10 may be provided to maintain the door 100 in an open and/or closed position, such as in connection with a motion limit bracket depicted hereafter at FIG. 5.

When in a closed position as depicted at FIG. 1, a higher portion of the door 100 may be provided at the rearward portion of the door relative to a height of the door 100 at a forward portion of the door. This configuration may enhance visibility of an occupant operator while providing sufficient door area to resist ingress or egress in/from the seating area. As depicted in FIG. 3, the seating area is comprised of a seat bottom 30 having a front edge 32 and a rearward portion 34. The seating area is also comprised of a seat back 36 positioned proximate the rearward portion 34 of the seat bottom 30. The pivotable coupling between the door 100 and the vehicle 10 is depicted rearward of the front edge 32. Specifically, the hinge assembly 102 is positioned at or rearward of the rearward portion 34 of the seat bottom, in an exemplary aspect. Further, the hinge assembly may be pivotally coupled with the utility vehicle 10 inferior (below) a height of a top surface of the seat bottom 30. However, it is contemplated that the hinge assembly 102 may be positioned superior (above) the top surface of the seat bottom 30, in an exemplary aspect.

A longitudinally-pivoting door is a door that pivots about an axis such that a longitudinal length of the door (e.g., front to back in the closed position) remains in general alignment with the longitudinal direction of the vehicle as it pivots between an opened and closed position. In some embodiments, the door 100 may be optionally secured to the ROPS or frame or may otherwise be biased in the open position such that the door 100 does not unintentionally swing closed. A longitudinally-pivoting door may be contrasted with a traditional automotive door that transitions from having a longitudinal length that is generally aligned with the automotive vehicle's longitudinal length in the closed position to traverse (or even perpendicular) in an opened position (e.g., the door swing out from a vehicle's midline). In an example, a longitudinally-pivoting door has a longitudinal orientation that changes from near horizontal in a closed position to near vertical when pivoted into an open position, in an exemplary aspect. A longitudinally-pivoting door may also be contrasted to a winged door (e.g., gullwing door) that pivots about an axis generally aligned with the longitudinal direction of the vehicle. A longitudinally-pivoting door pivots about an axis that is generally perpendicular to the vehicle longitudinal axis, in an exemplary aspect. It is contemplated that lines and portions of a vehicle are not rectangular or perpendicular and therefore and portions for ergonomic, style, and aerodynamic purposes will cause one or more lines, axis, and planes to deviate from a square relationship and for that reason, relationships to the longitudinal direction are intended to be general in nature and not limiting to precise parallel and perpendicular interpretations.

For example, if the rear upright frame 202 extends toward a midline of the vehicle to provide a tapered roll cage, if the door 100 is pivotally mounted to the inclined rear upright frame 202, when the door 100 pivots, the arc will be in the general direction of the vehicle's longitudinal axis, but it may deviate based on the angled attachment point. However, even with this deviation, the door is still a longitudinally-pivoting door, in this example.

Figure 4:
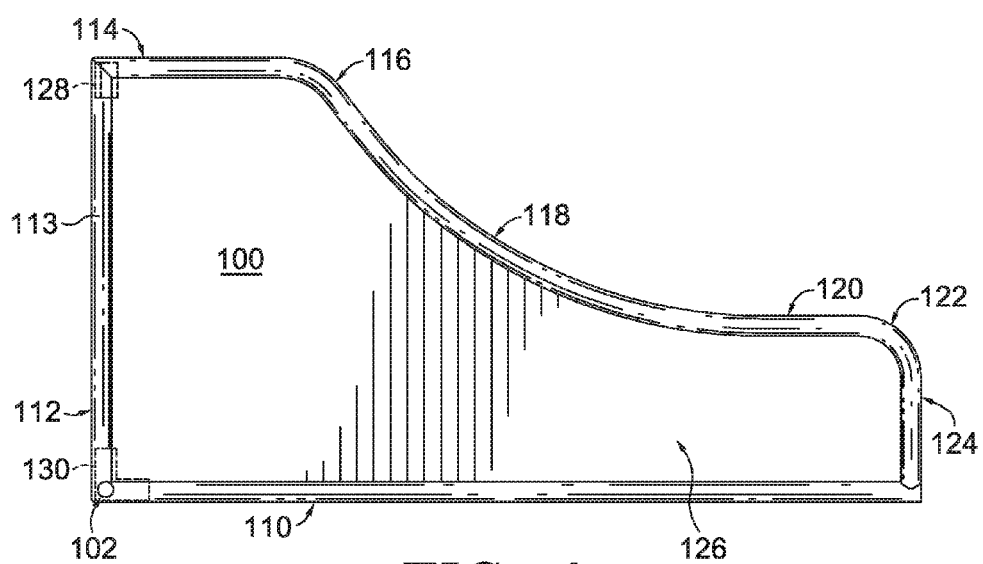
FIG. 4 depicts a side perspective of the longitudinally-pivoting door, in accordance with aspects hereof.

FIG. 4 depicts a side projection view of one embodiment of the door 100, in accordance with aspects hereof. The door 100 is comprised of a frame 113 and a panel 126, in an exemplary aspect. The frame 113 is comprised of rear upright member 112, a top member 114, a convex member 116, a concave member 118 a lower top member 120, a second convex member 122, a front upright member 124, and a bottom member 110, in an exemplary aspect. It is understood that one or more members may be integrally formed elements as opposed to distinct elements combined to form the frame 113. For example, it is contemplated that members 114, 116, 118, 120, 122, and 124 are formed from a common tubular structure that has been manipulated (e.g., bent) to form the distinct portions. It is further contemplated that additional or fewer elements may be integral to form portions or the entirety of the frame 113. Further, it is contemplated that a frame may be omitted altogether and the panel 126 serves as both a structural member in place of a traditional frame and an enclosure material for the door. Therefore, reference to a door "frame" refers to both a distinct frame and an integral frame formed by a panel. The frame 113 may be formed from any material, such as metal or plastic. It is contemplated that the frame 113 may be formed from square or round tubular materials. In an exemplary aspect, the frame 113 is formed from round metal (e.g., steel, aluminum) tubular sections. FIGS. 1-4 depict one embodiment of the shape of the door 100, but it is contemplated that several other suitable shapes for the door 100 may be used as well.

The hinge assembly 102 may extend through the frame 113 at, or near, the intersection of member 112 and 110, such as near (e.g., proximate) the bottom edge of the door 100 towards the rear. As will be depicted in FIGS. 5-8 hereinafter, it is contemplated that the hinge assembly 102 may extend through at least a portion of the frame 113, such as a wall/surface of the frame closest to the utility vehicle 10. Further, it is contemplated that the hinge assembly does not pass through to the exterior of the door 100, in an exemplary aspect.

The rearward opening of the door 100 provides a number of advantages. For example, a rearward opening longitudinal pivoting door does not limit visibility when the door is open as would a forward opening longitudinal pivoting door. Additionally, a rearward opening longitudinal door is maintained in a closed position with a sudden deceleration (e.g., braking) of the vehicle that is traveling in the traditional forward direction. Therefore, the arrangement of a hinge assembly behind a center of mass for the door 100 allows the door to more easily self-secure during a sudden deceleration than a forward opening door.

The panel 126 may be formed from any material, such as plastic, metal, or organic materials (e.g., cellulose based materials). The panel 126 may be solid or include apertures. For example the panel may be formed from a netting material or other cross-hatch like configuration of flexible or rigid materials. Similarly, the panel 126 may be a solid metallic panel, a metallic panel with one or more apertures extending there through, or a decorative panel with internal structural reinforcements. Further yet, it is contemplated that the panel 126 may be formed from one or more molded plastic (e.g., polymer-based materials), such as a blow molded, injection molded, or rotationally molded polymer panel. In light of the previous discussion of an internal door frame, it is contemplated that the panel 126 and the frame are integral and indistinguishable in an exemplary aspect. In a further exemplary aspect, it is contemplated that a polymer door is formed with a self-supporting structure such that a supplemental frame is omitted. The polymer door may have one or more hinge portions integrated during the molding operation or as a post-processes application. For example, a bearing, pin, or other component may be integrally coupled with the polymer during or after the manufacturing of the door, in an exemplary aspect.

As depicted in FIG. 4, the door may be constructed in a ¾ door style having a greater height near the rear portion (e.g., proximate the rear upright member 112) than a height near the front (e.g., proximate the front upright member 124). As previously discussed, this ¾ door style may provide sufficient visibility and protection for the occupant(s) of the seating area. Further, the weight of the door 100 may be reduced by utilizing a ¾ door style as opposed to a full door. This reduction in weight may be noticed as the longitudinally-pivoting door is raised against the force of gravity, as opposed to a traditional automotive style door that pivots outwardly.

FIG. 5 depicts a front projection view of the door 100, in accordance with aspects hereof. The frame members 118 and 124 are depicted with the top member 114. Opposite the top member 114 is the hinge assembly 102, which is longitudinally offset from the front member 124. Also depicted in FIG. 5 is a motion limit bracket 128. The motion limit bracket 128 may be coupled to the door at a rearward and superior position. For example, the motion limit bracket may be coupled with the door 100 above the hinge assembly 102 at the rear of the door. In an additional example, the motion limit bracket 128 is coupled with the frame proximate the top member 114 and the rear upright member 112 (as depicted in FIG. 4). In an exemplary aspect, the motion limit bracket 128 is an "L"-bracket with the base of the L extending traverse from the door 100 and the leg of the "L" mounted to the door 100. The base of the "L" may then engage a roll cage member when in the closed position and engage another member interior and rearward to the roll cage member when in the open position, in an exemplary aspect.

The motion limit bracket 128 limits the range of motion for the door 100, in an exemplary aspect. The motion limit bracket 128 may engage with the utility vehicle when the door is in the open, closed, and/or transitional positions. For example, it is contemplated that the motion limit bracket prevents the door from extending beyond a near vertical position when the door is in the open configuration. Similarly, it is contemplated that the motion limit bracket 128 engages the utility vehicle, such as the roll cage, to prevent the door from pivoting beyond an intended closed position.

Further, as previously discussed with respect to the channel receiver 104 of FIG. 1-3, one or more releasable securing mechanisms may be implemented in connection with or in place of the motion limit bracket 128. As previously discussed, the securing mechanisms may be mechanical and/or magnetic in nature. For example, it is contemplated that the motion limit bracket 128 comprises a magnet, such as a neodymium rare earth magnet, on one or more surfaces for interaction with the utility vehicle to keep the door open or closed by magnetic attraction. In an aspect, it is contemplated that the motion limit bracket 128 is magnetically attracted to (or magnetically attracts) an element of the roll cage to keep the door in a closed position even when traveling over rough and bumpy terrain. Further, aspects contemplate the motion limit bracket 128 being magnetically attracted to another element of the utility vehicle near the cargo area to keep the door in an open position, even when the vehicle is parked at an incline or other orientation that causes the door to resist staying open. The magnets may apply any desired degree of force, such a 5-30 pound, or more specifically 10-20 pounds in an aspect.

It is contemplated that the motion limit bracket 128 extends laterally from the door 100 in a common direction as the hinge assembly 102 also extends from the door 100. The motion bracket 128 may extend laterally any amount, such as 0.5 inches to 6 inches, in an exemplary aspect. The motion limit bracket 128 may be constructed from any material, such as a polymer-based material or a metallic-based material. The motion limit-bracket 128 may be secured to the door 100 using any coupling technique, such a mechanical fasteners (e.g., bolts, rivets, screws), adhesives, and/or welding.

FIG. 6 depicts a zoomed view of the hinge assembly 102 pivotally coupled with door 100, in accordance with aspects hereof. A reinforcement bracket 130 is provided with the door 100 to reinforce the door 100 about the hinge assembly 102. In an exemplary aspect, the reinforcement bracket 130 is an "L"-shaped bracket that extends between frame members 110 and 112 of FIG. 4. It is contemplated that a pin 306 introduced in FIG. 7 hereinafter of the hinge assembly 102 extends through the reinforcement bracket 130 and into (if not through) the door 100, in an exemplary aspect.

Turning to FIGS. 7 and 8 that illustrate a cross sectional and perspective view of the hinge assembly 102, respectively, in accordance with aspects hereof. Similarly numbered features are provided in FIG. 6 for reference purposes to establish a relationship with the door 100, in accordance with an aspect hereof. While a specific hinge assembly 102 is depicted herein, it is contemplated that any hinge may be implemented. For example, a simple bolt or other member extending in a lateral direction between the door 100 and one or more portions of the utility vehicle, such as a roll cage, may serve as a longitudinal pivot hinge assembly, in an exemplary aspect.

The hinge assembly 102 of FIGS. 7 and 8 comprises a first hinge sleeve 302 and a second hinge sleeve 304. The first hinge sleeve 302 receives and surrounds a portion of the second hinge sleeve 304. The hinge sleeves may serve as housing for supporting one or more bearings, such as bearing 318 in the first hinge sleeve 302 and bearing 312 in the second hinge sleeve 304. The hinge sleeves may also serve as a contacting portion for contacting the utility vehicle portion to which the hinge assembly 102 is pivotally coupled, such as a portion of a roll cage. For example, the hinge sleeves may pass through a rear upright member of a roll cage to secure the hinge assembly 102 with the utility vehicle.

The hinge assembly 102 is also comprised of the pin 306. The pin 306 may extend through and from a first end to a second end of the hinge sleeves and be rotationally supported by the bearings 312 and 318. The rotational support within the hinge sleeves allows the pin 306 to rotate within the hinge sleeves with a load, such as the door 100, applied to the hinge assembly 102. In an exemplary aspect, a first end of the pin 306 passes through a washer 320 at a flange 316 of the first hinge sleeve 302. The pin 306 continues past the washer 320 and extends through a radius filler 322 and a castle nut 324. The portion of the pin 306 distal the washer 320 extends to and into the door 100, in an exemplary aspect. For example, the door 100 may be formed from a round tube frame by the radius filler 322, the round tube having an inner radius corresponding to the radius filler 322 radius. Therefore, a force applied to the round tube frame is evenly distributed by the hinge assembly 102 internally to the frame, in an exemplary aspect. The pin 306 may include a securing hole 326, such as a hole for a cotter pin or safety wire. The securing hole 306 may be used to maintain the castle nut 324 in a desire position relative to the pin 306, in an exemplary aspect. It is understood that alternative securing mechanisms may be implemented in addition to or alternative to the castle nut 324.

At the second end of the pin 306 extending through the second hinge sleeve 304 at a flange 314 housing the bearing 312 is another washer 320 and a castle nut 308. It is contemplated that the hinge sleeves between the first flange 316 and the second flange 314 extend through a portion of the utility vehicle, such as a portion of the roll cage. In an exemplary aspect the hinge sleeve between the flanges 316 and 314 passes through the rear upright frame member 202 of FIG. 1.

The nesting relationship of the second hinge sleeve 304 within the first hinge sleeve 302 may allow for easy installation through one or more portions of the utility vehicle that may vary in thickness or other dimension. The castle nuts 308 and 324 may be tightened to secure the hinge assembly and door to the utility vehicle.

Figure 9:
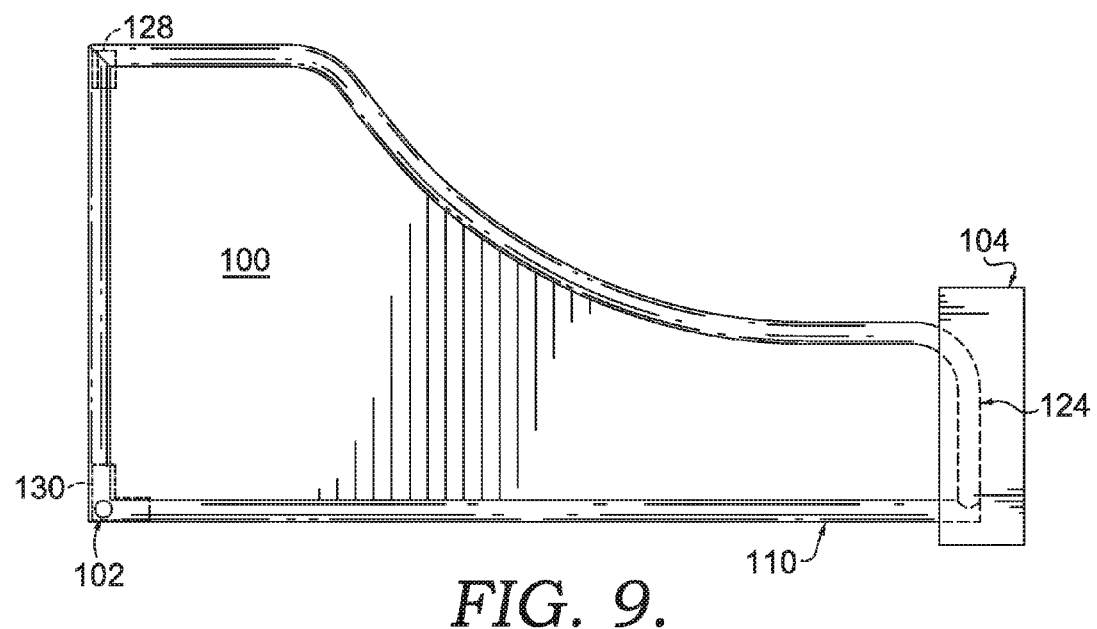
FIG. 9 depicts a longitudinally-pivoting door secured at a forward location in a channel receiver, in accordance with aspects hereof.

FIG. 9 depicts an exemplary channel receiver 104 receiving the door 200 at a distal end of the door 100 includes frame member 124, in accordance with aspects hereof. The channel receiver 104 may be integrally formed in one or more body panels of the utility vehicle. For example, it is contemplated that a front wheel fender cover or a front cowl assembly may include the channel receiver 104. Alternatively, it is contemplated that the channel receiver 104 is independent of body panels of the utility vehicle and a discrete part. For example, a U-bracket may be mounted to a side portion of the utility vehicle, such as a forward frame upright member on a roll cage. As such, it is contemplated that the door 100 is secured both in the rear and the in the front to portions of the roll cage to prevent a lateral movement of the door 100 while still allowing a longitudinal pivot of the door.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A utility vehicle, comprising:
a frame extending in a longitudinal direction from a front end to a rear end;
a plurality of wheels operably coupled to the frame;
a seating area;
a side door pivotally mounted to the vehicle having a rearward pivotal arc extending in the longitudinal direction of the frame; and
a channel receiver comprising a channel defined by a first side, a base, and a second side laterally spaced from the first side, wherein the channel receiver is configured to receive a forward edge of the side door between the first side and second side when the side door is in a closed position.

2. The utility vehicle of claim 1, wherein the seating area is comprised of a seat having a seat bottom and a seat back, wherein the seat bottom has a rearward end that is more proximate the seat back than a forward end.

3. The utility vehicle of claim 2, wherein the side door is comprised of a hinge assembly, the hinge assembly is coupled with the utility vehicle rearward of the seat bottom forward end.

4. The utility vehicle of claim 2, wherein the side door in the closed position extends above a top surface of the seat bottom.

5. The utility vehicle of claim 1, wherein the utility vehicle further comprises a roll cage including a front frame upright that is forward of the seating area and a rear frame upright that is rearward of the seating area, the roll cage coupled with the frame.

6. The utility vehicle of claim 5, wherein the side door is pivotally coupled with the vehicle at the rear frame upright.

7. The utility vehicle of claim 5, wherein a forward portion of the side door when in the closed position is more forward of the pivotal mounting than the forward portion of the door when in an open position.

8. The utility vehicle of claim 7, wherein the side door forward portion is more proximate the roll cage front frame upright in the closed position than the side door forward portion when in the open position, and wherein the side door forward portion is more proximate the roll cage rear upright frame in the open position than the side door forward portion when in the closed position.

9. The utility vehicle of claim 1, wherein the side door is further comprised of a hinge assembly that pivotally couples the side door with the utility vehicle.

10. The utility vehicle of claim 9, wherein the hinge assembly is rigidly coupled with the side door and a roll cage proximate a rearward portion of the seating area in a lateral direction of the utility vehicle, such that the hinge assembly resists a lateral motion of the side door.

11. The utility vehicle of claim 9, wherein the side door is comprised of a motion limit bracket, the motion limit bracket coupled to the side door, the side door having a vertical direction and a perpendicular longitudinal direction when in the closed position, the motion limit bracket coupled to the side door above the hinge assembly in the vertical direction.

12. The utility vehicle of claim 11, wherein the motion limit bracket is comprised of a magnetic member, the magnetic member releasably engaged with the roll cage member when in the closed position.

13. A utility vehicle, comprising:
a frame extending in a generally longitudinal direction;
a plurality of wheels operably coupled to the frame;
a seating area at a first longitudinal position relative to the frame;
a roll cage enclosing the seating area and defined by a plurality of frame members coupled to the frame, at least some of the frame members being in the form of frame uprights, and the frame members defining an envelope around the seating area;

a side door pivotally coupled to a first frame upright of the frame uprights and being slidably secured proximate to a second frame upright of the frame uprights, the side door having a pivotable arc extending in the longitudinal direction of the vehicle between a closed position and an open position, wherein the first frame upright is rearward of the second frame upright in the utility vehicle longitudinal direction, wherein a distal end of the side door extends from the second frame upright in the closed position to the first frame upright in the open position, wherein the side door is further comprised of a motion limit bracket, the motion limit bracket releasably engaged with the utility vehicle proximate the first frame upright when the side door is in the closed position and the motion limit bracket releasably engaged with the utility vehicle rearward of the first frame upright when in the open position; and a channel receiver coupled with the utility vehicle proximate the second frame upright, the channel receiver adapted to slidably receive a front portion of the side door when in the closed position; wherein a channel of the channel receiver is open in a rearward longitudinal direction.

14. The utility vehicle of claim 13, wherein the channel receiver includes a U-shaped cavity with an upright ingress and egress portion to slidably receive the side door within the U-shaped cavity.

15. The utility vehicle of claim 13 further comprising a vibration damping material coupled within the channel of the channel receiver.

16. The utility vehicle of claim 13, wherein the channel receiver includes a releasable securing element to maintain the side door in the closed position.

17. The utility vehicle of claim 16, wherein the releasable securing element is one of: a mechanical lock; or a magnet lock.

* * * * *